US009114776B2

(12) United States Patent
Thomas et al.

(10) Patent No.: US 9,114,776 B2
(45) Date of Patent: Aug. 25, 2015

(54) VEHICLE AND AN AIRBAG ASSEMBLY FOR THE VEHICLE

(71) Applicant: GM GLOBAL TECHNOLOGY OPERATIONS LLC, Detroit, MI (US)

(72) Inventors: Scott D. Thomas, Novi, MI (US); Howard C. Weiss, Troy, MI (US); Kenneth M. Zawisa, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/179,965

(22) Filed: Feb. 13, 2014

(65) Prior Publication Data
US 2014/0333053 A1 Nov. 13, 2014

Related U.S. Application Data

(60) Provisional application No. 61/821,528, filed on May 9, 2013.

(51) Int. Cl.
*B60R 21/233* (2006.01)
*B60R 21/2338* (2011.01)
*B60R 21/232* (2011.01)
*B60R 21/231* (2011.01)

(52) U.S. Cl.
CPC ............. *B60R 21/233* (2013.01); *B60R 21/232* (2013.01); *B60R 21/2338* (2013.01); *B60R 2021/23107* (2013.01); *B60R 2021/23386* (2013.01)

(58) Field of Classification Search
CPC combination set(s) only.
See application file for complete search history.

(56) References Cited

U.S. PATENT DOCUMENTS

| 6,010,149 | A  | * | 1/2000  | Riedel et al. ............... 280/730.2 |
| 6,135,490 | A  | * | 10/2000 | Spary .......................... 280/730.2 |
| 7,121,584 | B2 | * | 10/2006 | Hasebe et al. ............. 280/743.2 |
| 7,152,877 | B2 | * | 12/2006 | Hasebe et al. ............. 280/743.1 |
| 7,390,020 | B2 | * | 6/2008  | Hasebe et al. ............. 280/743.2 |
| 7,631,895 | B2 | * | 12/2009 | Kalliske et al. ............ 280/743.2 |
| 7,828,322 | B2 | * | 11/2010 | Breuninger et al. ........ 280/730.2 |
| 7,922,193 | B2 |   | 4/2011  | Breuninger et al. |
| 7,967,334 | B2 |   | 6/2011  | Breuninger et al. |
| 8,360,469 | B2 | * | 1/2013  | Wiik et al. ................. 280/743.2 |
| 8,684,408 | B2 | * | 4/2014  | Thomas et al. ............ 280/743.2 |
| 8,899,617 | B2 | * | 12/2014 | Fukawatase et al. ...... 280/730.2 |
| 2011/0187087 | A1 | * | 8/2011 | Kibat ........................ 280/730.2 |
| 2012/0038137 | A1 | * | 2/2012 | Wipasuramonton et al. . 280/733 |
| 2012/0091697 | A1 | * | 4/2012 | Wiik et al. ................. 280/730.2 |

FOREIGN PATENT DOCUMENTS

DE 102008064571 A1 * 9/2009 ............ B60R 21/233

* cited by examiner

*Primary Examiner* — Nicole Verley
(74) *Attorney, Agent, or Firm* — Quinn Law Group, PLLC

(57) ABSTRACT

A vehicle and an airbag assembly are disclosed. A bladder includes a first expandable region defining a first maximum width between first and second sides of the first expandable region along a first axis when in a deployed position and a second expandable region defining a second maximum width between first and second sides of the second expandable region along the first axis when in the deployed position. A tether faces the second side of the first expandable region. The tether is attached to the bladder such that the first side of the second expandable region and the second side of the first expandable region partially overlap each other in the deployed position to cause the first expandable region to deploy outwardly in front of the second expandable region to define a total width along the first axis greater than one of the first and second maximum widths.

20 Claims, 9 Drawing Sheets

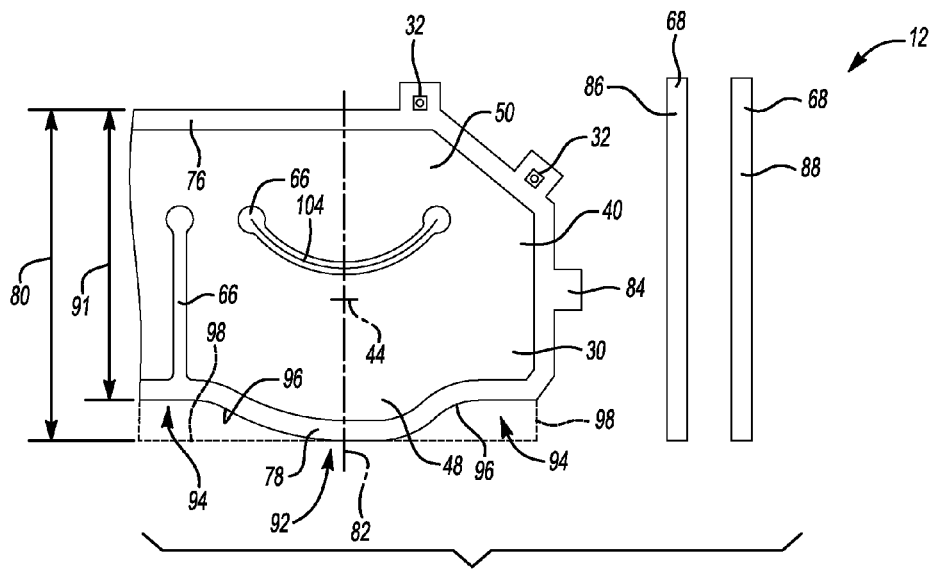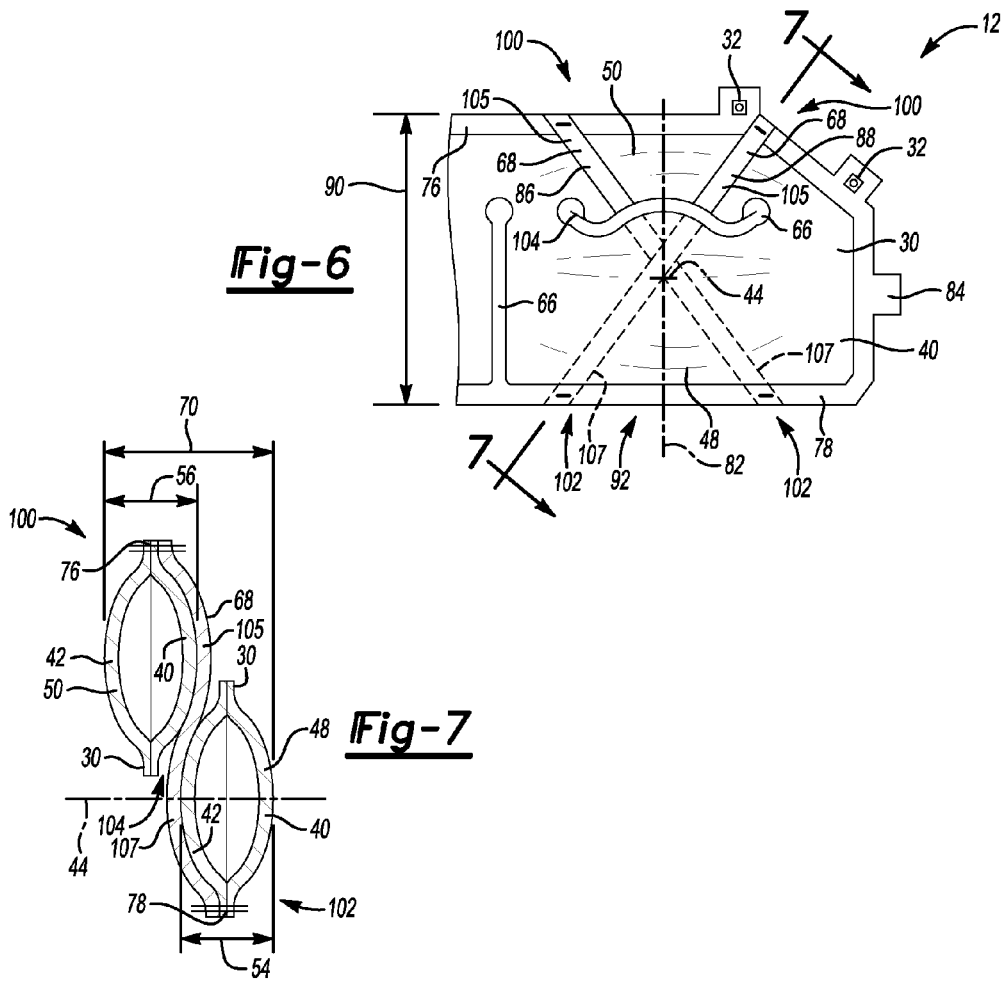

US 9,114,776 B2

VEHICLE AND AN AIRBAG ASSEMBLY FOR THE VEHICLE

CROSS-REFERENCE TO RELATED APPLICATIONS

This application claims the benefit of U.S. Provisional Application No. 61/821,528, filed on May 9, 2013, which is hereby incorporated by reference in its entirety.

TECHNICAL FIELD

The present disclosure relates to a vehicle and an airbag assembly for the vehicle.

BACKGROUND

Many vehicles include one or more airbags inside the vehicle. For example, airbags have been utilized in steering wheels and instrument panels of various vehicles. Recently, side airbags have been developed for vehicles. Side airbags can be utilized along a roof rail of the vehicle, one or more pillars of the vehicle, in one or more seats of the vehicle, or in one or more doors of the vehicle.

SUMMARY

The present disclosure provides an airbag assembly for a vehicle. The airbag assembly includes a bladder adapted to be attached to the vehicle. The bladder includes a first side and a second side opposing each other along a first axis. The bladder presents a pre-deployed position being deflated and a deployed position being inflated. The bladder includes a first expandable region and a second expandable region adjacent to each other, with the first and second expandable regions each having the first and second sides. The first expandable region defines a first maximum width between the first and second sides of the first expandable region along the first axis when in the deployed position and the second expandable region defines a second maximum width between the first and second sides of the second expandable region along the first axis when in the deployed position. The airbag assembly further includes a tether facing the second side of the first expandable region. The tether is attached to the bladder such that the first side of the second expandable region and the second side of the first expandable region partially overlap each other in the deployed position to cause the first expandable region to deploy outwardly in front of the second expandable region to define a total width along the first axis greater than one of the first and second maximum widths.

The present disclosure also provides a vehicle including a vehicle structure. The vehicle structure defines an interior compartment. The vehicle also includes an airbag assembly. The airbag assembly includes a bladder attached to the vehicle structure. The bladder includes a first side and a second side opposing each other along a first axis. The bladder presents a pre-deployed position being deflated and a deployed position being inflated. The first side faces toward the interior compartment when in the deployed position and the second side faces outwardly away from the interior compartment. The bladder includes a first expandable region and a second expandable region adjacent to each other, with the first and second expandable regions each having the first and second sides. The first expandable region defines a first maximum width between the first and second sides of the first expandable region along the first axis when in the deployed position and the second expandable region defines a second maximum width between the first and second sides of the second expandable region along the first axis when in the deployed position. The airbag assembly further includes a tether facing the second side of the first expandable region. The tether is attached to the bladder such that the first side of the second expandable region and the second side of the first expandable region partially overlap each other in the deployed position to cause the first expandable region to deploy outwardly in front of the second expandable region to define a total width along the first axis greater than one of the first and second maximum widths.

The airbag assembly is configured to keep packaging size down while providing an increase in size when deployed. Furthermore, the total width of the airbag assembly can cooperate with other airbags in the vehicle to minimize a gap between the airbags.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 5 is a schematic exploded fragmentary side view of the airbag assembly of one embodiment, with the bladder in a pre-deployed position and including a first expandable region and a second expandable region, with a tether defined as a first strap and a second strap.

FIG. 6 is a schematic fragmentary side view of the airbag assembly of FIG. 5, with the bladder in the deployed position.

FIG. 7 is a schematic cross-sectional view of the airbag assembly taken from lines 7-7 of FIG. 6.

DETAILED DESCRIPTION

Those having ordinary skill in the art will recognize that terms such as "above", "below", "upward", "downward", "top", "bottom", etc., are used descriptively for the figures, and do not represent limitations on the scope of the invention, as defined by the appended claims. Furthermore, the invention may be described herein in terms of functional and/or logical block components and/or various processing steps. It should be realized that such block components may be realized by any number of hardware, software, and/or firmware components configured to perform the specified functions.

Figure 1:
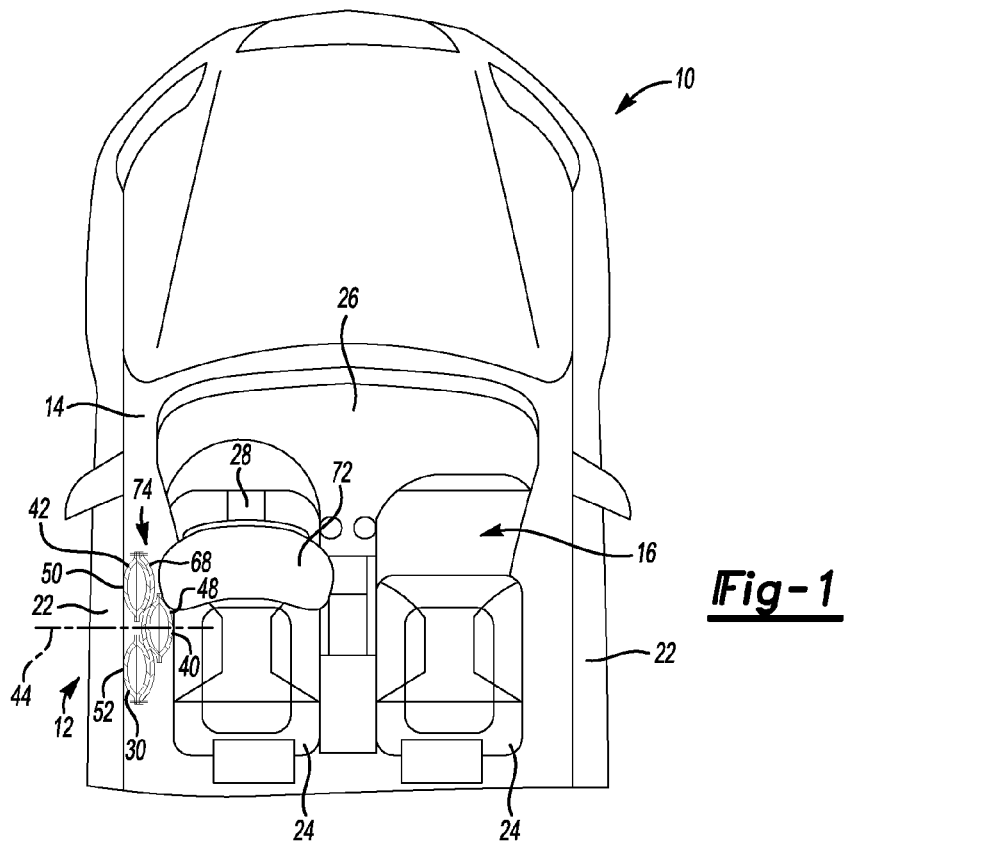
FIG. 1 is a schematic fragmentary plan view of a vehicle including a vehicle structure defining an interior compartment, and an airbag assembly in a deployed position illustrated in cross-section and orientated relative to a driver's side door and seat of the vehicle.

Referring to the Figures, wherein like numerals indicate like or corresponding parts throughout the several views, a vehicle 10 and an airbag assembly 12 for the vehicle 10 are generally shown in FIG. 1. Generally, the airbag assembly 12 can be useful for vehicles 10, such as automotive vehicles 10. It is to be appreciated that the airbag assembly 12 can also be useful for non-automotive applications including, for example, farm, boat and aviation applications, etc. Furthermore, it is to be appreciated that a plurality of airbag assemblies 12, as discussed herein, can be utilized with the vehicle 10.

Figure 2:
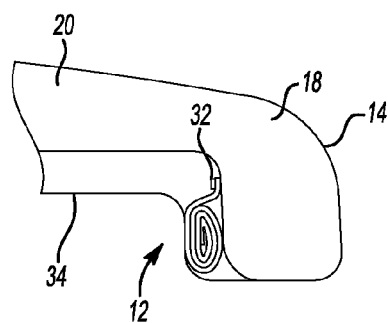
FIG. 2 is a schematic end view of the airbag assembly attached to the vehicle structure relative to the driver's side of the vehicle, with the airbag assembly in an installation orientation and a pre-deployed position.

Turning to FIGS. 1 and 2, the vehicle 10 includes a vehicle structure 14 defining an interior compartment 16. The vehicle structure 14 can be a vehicle frame, a chassis, a support, a pillar or any other suitable vehicle structure. For example, the vehicle structure 14 can include an A-pillar of the vehicle 10, a B-pillar of the vehicle 10, a C-pillar of the vehicle 10, a D-pillar of the vehicle 10, a roof rail 18, and/or a roof 20 of the vehicle 10. Generally, the pillars and the roof 20 can cooperate to form the interior compartment 16 of the vehicle 10. It is to be appreciated that the pillars and the roof rail 18 are located on both a driver's side of the vehicle 10 and a passenger's side of the vehicle 10. Furthermore, it is to be appreciated that the interior compartment 16 can be referred to as a passenger compartment.

Continuing with FIGS. 1 and 2, the vehicle 10 can also include one or more doors 22 movably coupled to the vehicle structure 14 to allow the occupant into and out of the interior compartment 16. The vehicle 10 can also include one or more seats 24 disposed inside the interior compartment 16. Furthermore, the vehicle 10 can include an instrument panel 26 and a steering wheel 28 extending outwardly from the instrument panel 26 for steering the vehicle 10. Generally, the airbag assembly 12 can be attached or mounted to the vehicle 10 in various locations inside or outside of the vehicle 10. For example, the airbag assembly 12 can be attached to the seat 24, the instrument panel 26, the steering wheel 28, the roof 20, one or more roof rails 18, one or more pillars, one or more doors 22, etc. inside the interior compartment 16. As another example, the airbag assembly 12 can be attached or mounted to the vehicle structure 14 outside of the interior compartment 16 such that the airbag assembly 12 covers or shields the vehicle 10 to prevent an object from directly engaging or contacting the vehicle 10.

Figure 3:
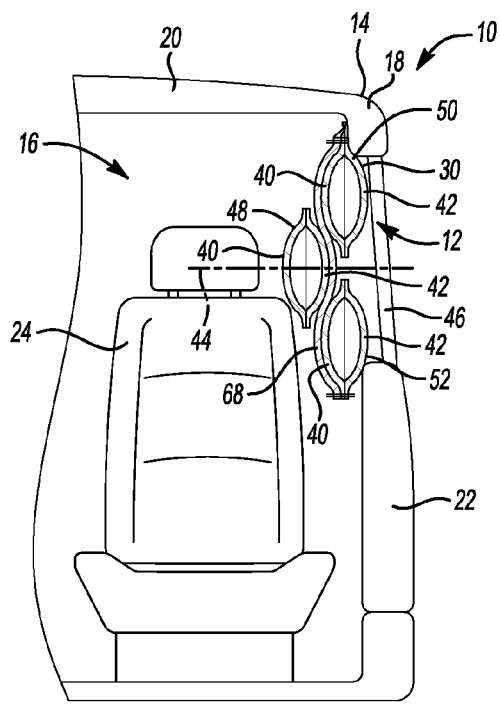
FIG. 3 is a schematic cross-sectional view of another airbag assembly in the deployed position and orientated relative to the driver's side door and seat of the vehicle.
Figure 4:
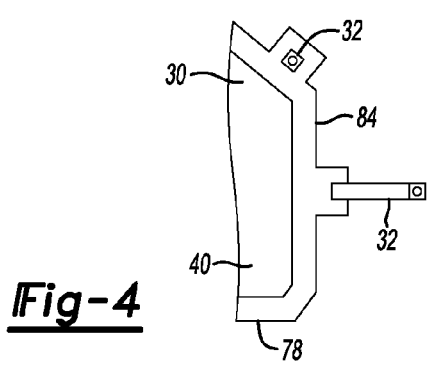
FIG. 4 is a schematic fragmentary side view of a bladder of the airbag assembly illustrating different fastener configurations and locations.

Referring to FIGS. 1-3, the airbag assembly 12 includes a bladder 30 adapted to be attached to the vehicle 10. More specifically, the bladder 30 is attached or mounted to the vehicle structure 14. For illustrative purposes only, FIGS. 2 and 3 illustrate the airbag assembly 12, and thus the bladder 30, being attached to the roof rail 18 of the vehicle 10 from inside the interior compartment 16. The airbag assembly 12 can be attached or mounted to the vehicle structure 14 by any suitable methods, such as for example, one or more fasteners 32 (see for example FIGS. 4-6) such as screws, bolts, tabs, pins, barbs, clips, harnesses, etc. The fasteners 32 are shown in schematic in the Figures for illustrative purposes only. It is to be appreciated that the airbag assembly 12 can be attached or mounted to other components of the vehicle 10, as discussed above. It is to also be appreciated that the bladder 30 can be referred to as a cushion.

Referring to FIG. 2, the airbag assembly 12 can be packaged in an installation orientation for assembly purposes. For example, the airbag assembly 12 can be pre-packaged in the installation orientation such that the assembler can attach the airbag assembly 12 to the desired location quickly and/or efficiently. The airbag assembly 12 can be folded, rolled, etc., and attached to the roof rail 18 and/or one or more of the pillars such that the airbag assembly 12 is packaged behind one or more trim panels 34 of the vehicle 10. Therefore, the airbag assembly 12 can be hidden from the occupant of the interior compartment 16 for aesthetic purposes.

The bladder 30 presents a pre-deployed position being deflated and a deployed position being inflated. Said differently, the bladder 30 is deflated or substantially flat when in the pre-deployed position and not in the installation orientation, and the bladder 30 is inflated or expanded when in the deployed position. Therefore, the bladder 30 is packaged in the vehicle 10 when in the pre-deployed position. The pre-deployed position is shown in FIG. 2 in the installation orientation (i.e., folded, rolled, etc.), and the pre-deployed position is shown in FIGS. 5, 17-20 and 24 and not in the installation orientation (i.e., prior to folding, rolling, etc.). Furthermore, the deployed position is shown in FIGS. 1, 3, 6-16, 21-23, 25, 26 and 29. As such, when the bladder 30 is in the pre-deployed position, the bladder 30 can be rolled/folded and hidden behind one or more trim panels 34 in the installation orientation. The airbag assembly 12 is configured to keep packaging size down while providing an increase in size when inflated to the deployed position. Unless indicated otherwise, when referring to the pre-deployed position below, the bladder 30 is flat and not folded or rolled in the installation orientation.

Figure 10:
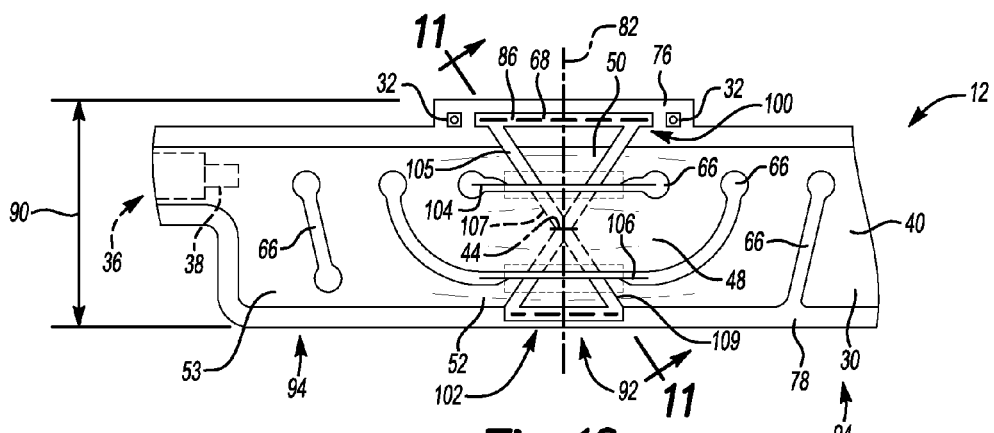
FIG. 10 is a schematic fragmentary side view of the airbag assembly of another embodiment, with the bladder in the deployed position.

Turning to FIG. 10, the bladder 30 can be inflated utilizing a fluid injection device 36. The fluid injection device 36 can include a nozzle 38 and optionally a tube in fluid communication with the nozzle 38. The nozzle 38 is at least partially disposed in the bladder 30 while the tube is substantially disposed in the bladder 30 when utilized. The tube can be any suitable length inside the bladder 30. The tube can be formed of metal, aluminum, cloth, or any other suitable material(s). The fluid injection device 36 injects a fluid, such as a gas, into the bladder 30 to inflate the bladder 30 to the deployed position. The fluid injection device 36 is utilized with any of the configurations of the bladder 30 discussed herein.

Turning back to FIG. 3, generally, the bladder 30 includes a first side 40 and a second side 42 opposing each other along a first axis 44. More specifically, the first side 40 faces inwardly toward the interior compartment 16 when in the deployed position and the second side 42 faces outwardly away from the interior compartment 16 when in the deployed position. In other words, when the bladder 30 is unrolled and exposed inside the interior compartment 16 as shown in FIG. 3, the first side 40 of the bladder 30 faces inwardly toward the interior compartment 16 and the second side 42 faces outwardly away from the interior compartment 16. It is to be appreciated that the phrase "along the first axis 44" can include substantially parallel to the first axis 44 or collinearly with the first axis 44.

Generally, the bladder 30 is inflatable or expandable when a predetermined force engages the vehicle 10. In other words, when the predetermined force engages the vehicle 10, the bladder 30 fills with the fluid (e.g., gas) and expands to unroll and extend out from the trim panel 34 to cover, for example, a window 46 of the door 22, one or more pillars, etc. When the airbag assembly 12 is utilized with the window 46 of the door 22, the airbag assembly 12 can be referred to as a side airbag assembly 12. It is to be appreciated that a controller can be in communication with the airbag assembly 12 to signal the airbag assembly 12 to deploy to the deployed position when the predetermined force engages the vehicle 10. Furthermore, the controller signals the fluid injection device 36 to expel the fluid into the bladder 30.

Figure 8:
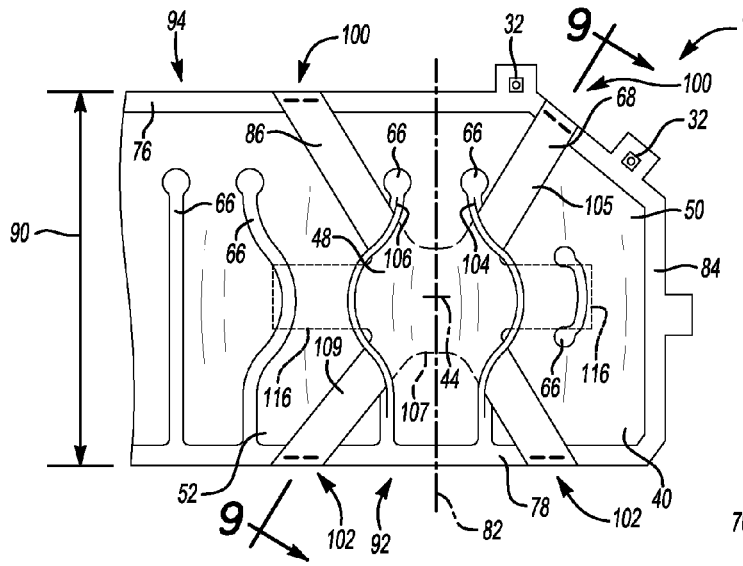
FIG. 8 is a schematic fragmentary side view of the airbag assembly of another embodiment, with the bladder including a first expandable region, a second expandable region and a third expandable region.

Referring to FIGS. 5-7, the bladder 30 includes a first expandable region 48 and a second expandable region 50 adjacent to each other, with the first and second expandable regions 48, 50 each having the first and second sides 40, 42. As shown in FIGS. 1, 3, 8-11, 17-21, 24-26 and 29, in certain embodiments, the bladder 30 can include a third expandable region 52, with the third expandable region 52 having the first and second sides 40, 42. Therefore, in certain embodiments, the bladder 30 includes two expandable regions 48, 50, and in other embodiments, the bladder 30 includes three expandable regions 48, 50, 52. The first, second and third expandable regions 48, 50, 52 can be in any suitable location and orientation. For example, when the airbag assembly 12 is not in the installation orientation, the first, second and third expandable regions 48, 50, 52 can be generally orientated horizontally (as best shown in FIGS. 3, 5, 6, 17-19 and 22) or generally orientated vertically (as best shown in FIGS. 1, 8 and 12). As another example, one or more of the expandable regions 48, 50, 52 can be generally diagonal. It is to be appreciated that the bladder 30 can include one or more additional expandable regions 53 as shown in FIGS. 10, 12-16, 22 and 23. Generally, when utilizing the tube of the fluid injection device 36, the tube defines a plurality of apertures to direct the fluid into respective expandable regions 48, 50, 52, 53. It is to be appreciated that the expandable regions 48, 50, 52, 53 can all be the same size, or alternatively, one or more of the expandable regions 48, 50, 52, 53 can be different sizes from each other. It is to also be appreciated that in FIG. 1 additional expandable regions 53 can be disposed forward, rearward, above and/or below the expandable regions 48, 50, 52 shown in this figure.

Figure 9:
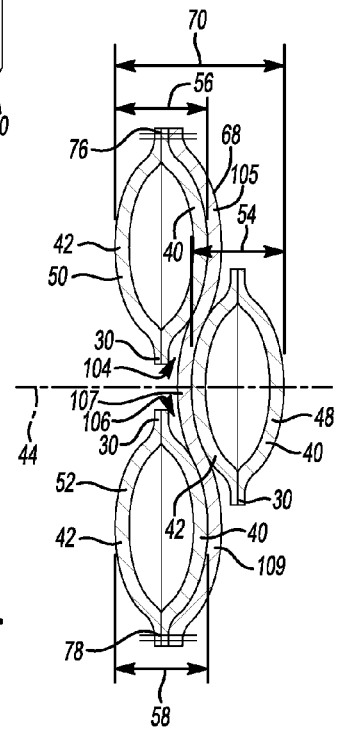
FIG. 9 is a schematic cross-sectional view of the airbag assembly taken from lines 9-9 of FIG. 8.
Figure 11:
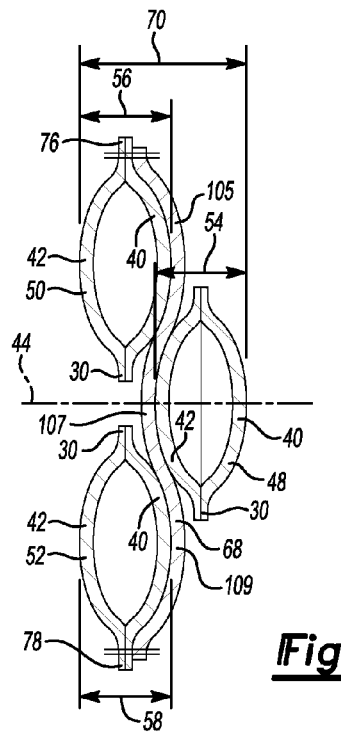
FIG. 11 is a schematic cross-sectional view of the airbag assembly taken from lines 11-11 of FIG. 10.
Figure 12:
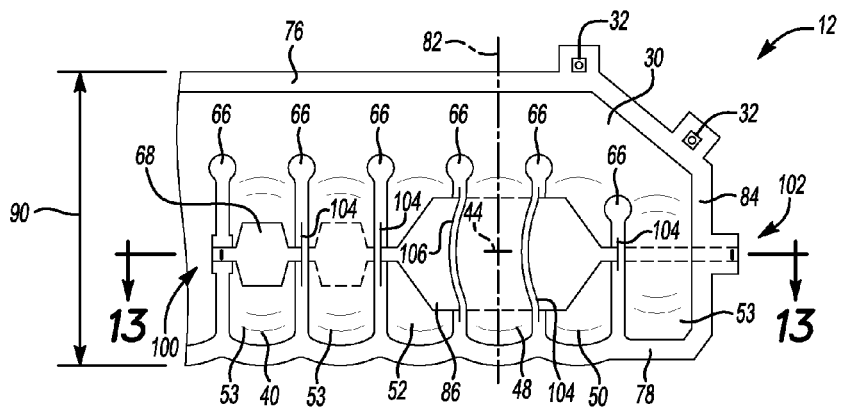
FIG. 12 is a schematic fragmentary side view of the airbag assembly of another embodiment, with the bladder including six expandable regions.
Figure 13:
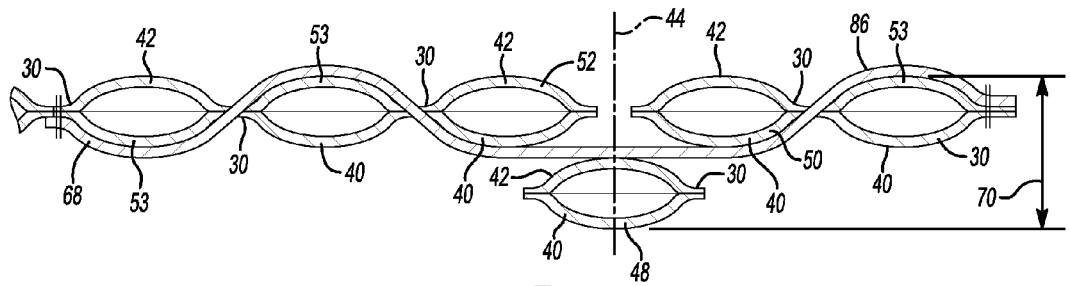
FIG. 13 is a schematic cross-sectional view of the airbag assembly taken from lines 13-13 of FIG. 12.
Figure 14:
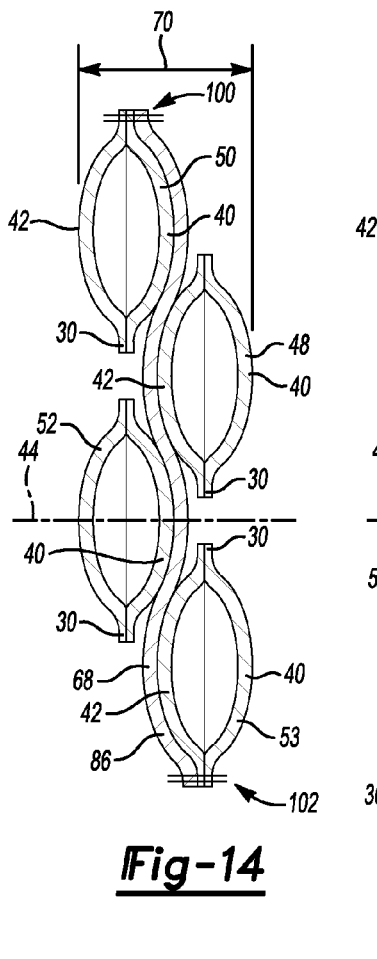
FIG. 14 is a schematic cross-sectional view of the airbag assembly of another embodiment, with the bladder including four expandable regions.
Figure 15:
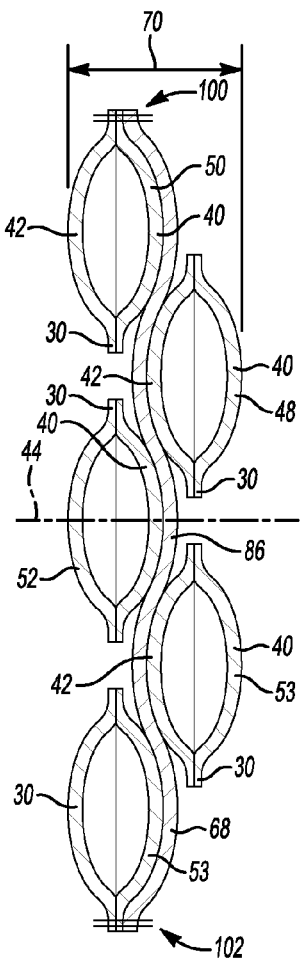
FIG. 15 is a schematic cross-sectional view of the airbag assembly of another embodiment, with the bladder including five expandable regions.
Figure 16:
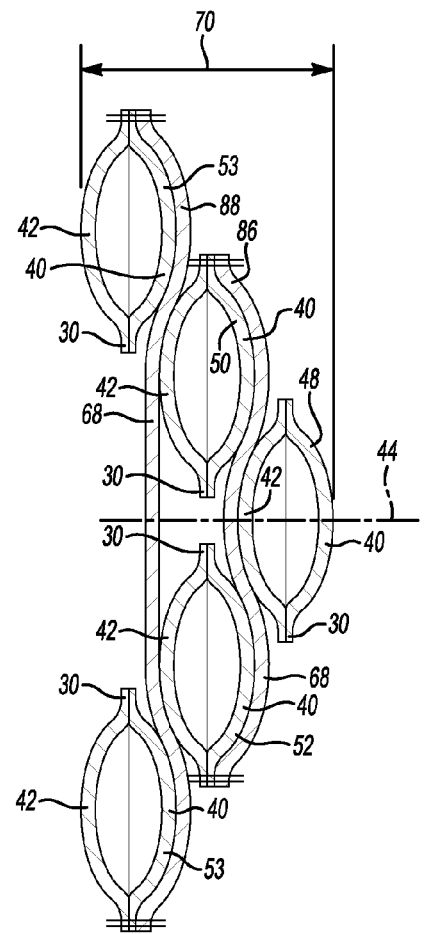
FIG. 16 is a schematic cross-sectional view of the airbag assembly of another embodiment, with the bladder including five expandable regions in a configuration different from FIG. 15.

As best shown in FIGS. 7, 9 and 11, the first expandable region 48 defines a first maximum width 54 between the first and second sides 40, 42 of the first expandable region 48 along the first axis 44 when in the deployed position. The second expandable region 50 defines a second maximum width 56 between the first and second sides 40, 42 of the second expandable region 50 along the first axis 44 when in the deployed position. In certain embodiments, the third expandable region 52 defines a third maximum width 58 between the first and second sides 40, 42 of the third expandable region 52 along the first axis 44 when in the deployed position. Again, it is to be appreciated that the phrase "along the first axis 44" can include substantially parallel to the first axis 44 or collinearly with the first axis 44.

Figure 24:
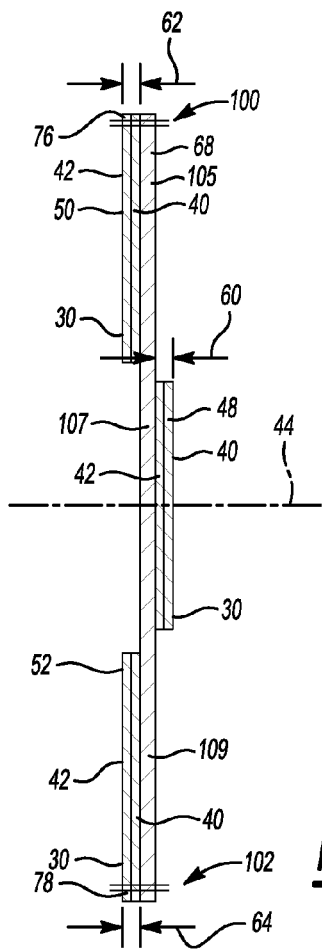
FIG. 24 is a schematic cross-sectional view of the airbag assembly being in the pre-deployed position.

As best shown in FIG. 24, the first expandable region 48 also defines a first minimum width 60 between the first and second sides 40, 42 of the first expandable region 48 along the first axis 44 when in the pre-deployed position. Furthermore, the second expandable region 50 also defines a second minimum width 62 between the first and second sides 40, 42 of the second expandable region 50 along the first axis 44 when in the pre-deployed position. In addition, the third expandable region 52 defines a third minimum width 64 between the first and second sides 40, 42 of the third expandable region 52 along the first axis 44 when in the pre-deployed position. Simply stated, when the bladder 30 is inflated (in the deployed position), the first, second and third expandable regions 48, 50, 52 define the first, second and third maximum widths 54, 56, 58, and when the bladder 30 is deflated (in the pre-deployed position before being in the installation orientation), the first, second and third expandable regions 48, 50, 52 define the first, second and third minimum widths 60, 62, 64. It is to be appreciated that the additional expandable regions 53 can include the same features as the first, second and third expandable regions 48, 50, 52.

As best shown in FIGS. 5, 6, 8, 10, 12, 17-20 and 22, the bladder 30 can define at least one separator region 66 to separate the first and second expandable regions 48, 50. As such, the separator region 66 is not inflatable. Therefore, the separator region 66 attaches or secures the first and second sides 40, 42 together in a desired location and orientation. For example, when the separator region 66 is orientated generally horizontally, the first and second expandable regions 48, 50 are correspondingly orientated generally horizontally (see FIGS. 6 and 17). As another example, when the separator region 66 is orientated generally vertically, the first and second expandable regions 48, 50 are correspondingly orientated generally vertically (see FIGS. 8 and 12). In various embodiments, the separator region 66 can be further defined as a plurality of separator regions 66. For example, one separator region 66 separates the first and second expandable regions 48, 50 and another separator region 66 separates the first and third expandable regions 48, 52. It is to be appreciated that any suitable number of separator regions 66 can be utilized to present the desired location and orientation of the expandable regions 48, 50, 52, 53. As mentioned above, the separator region(s) 66 can be any suitable orientation, such as for example, substantially straight, angled, curved, arcuate, diagonal, zigzagged (see FIG. 23), etc. The orientation of the separator region(s) 66 can change the orientation and/or shape of the expandable regions 48, 50, 52, 53. It is to be appreciated that the first and second sides 40, 42 along the separator region 66 can be attached or secured to each other by any suitable methods, such as for example, stitching, adhesive, silicone, integrally woven together, etc.

Referring to FIGS. 1, 3, 5-26 and 29, the airbag assembly 12 further includes a tether 68 attached to the bladder 30. The tether 68 faces the second side 42 of the first expandable region 48. Therefore, generally, the tether 68 is behind the first expandable region 48 such that the first expandable region 48 can move outwardly without interference from the tether 68. In certain embodiments, when the airbag assembly 12 is in the pre-deployed position (and not in the installation orientation), the first and second expandable regions 48, 50 can be spaced from each other such that the first and second expandable regions 48, 50 do not overlap (see FIG. 24). Alternatively, when the airbag assembly 12 is in the pre-deployed position (and not in the installation orientation), the tether 68 can be attached to the bladder 30 such that the first and second expandable regions 48, 50 partially overlap.

As best shown in FIG. 7, the tether 68 is attached to the bladder 30 such that the first side 40 of the second expandable region 50 and the second side 42 of the first expandable region 48 partially overlap each other in the deployed position to cause the first expandable region 48 to deploy outwardly in front of the second expandable region 50 to define a total width 70 along the first axis 44 greater than one of the first and second maximum widths 54, 56. More specifically, the first side 40 of the second expandable region 50 and the second side 42 of the first expandable region 48 partially overlap each other along the first axis 44 when in the deployed position such that part of the second side 42 of the first expandable region 48 and part of the first side 40 of the second expandable region 50 remain spaced from each other along the first axis 44 when in the deployed position. For example, as shown in FIGS. 1 and 3, the first expandable region 48 projects outwardly into the interior compartment 16 away from the vehicle structure 14, i.e., away from the driver's side window 46 in these Figures, when in the deployed position. Said differently, the first expandable region 48 projects outwardly in front of the second expandable region 50 when in the deployed position. As such, when the airbag assembly 12 is being utilized as the side airbag assembly 12, a steering wheel airbag 72 and the side airbag assembly 12 cooperate to minimize a gap 74 therebetween (see FIG. 1 in which both the side airbag and the steering wheel airbag 72 are deployed). As shown in FIG. 7, the tether 68 contours around the first and second expandable regions 48, 50 when in the deployed position. As such, in certain embodiments, the tether 68 is attached to the bladder 30 to move the first and second expandable regions 48, 50 toward each other when in the deployed position, which is at least partially due to the tether 68 contouring around the expanded first and second expandable regions 48, 50. In other words, as the first and second expandable regions 48, 50 expand, these regions 48, 50 can expand more than the tether 68 and thus this expanded size can contribute to the movement of the first and second expandable regions 48, 50 toward each other to at least partially overlap each other. The tether 68 maintains the position of the expandable regions 48, 50 relative to each other when in the deployed position. It is to be appreciated that the total width 70 can change depending on the orientation and number of expandable regions 48, 50, 52, 53 being utilized (compare for example FIGS. 7 and 16).

In certain embodiments, as best shown in FIGS. 9 and 11, the tether 68 is attached to the bladder 30 such that the first sides 40 of the second and third expandable regions 50, 52 and the second side 42 of the first expandable region 48 partially overlap each other in the deployed position to cause the first expandable region 48 to deploy outwardly in front of the second and third expandable regions 50, 52 along the first axis 44 to further define the total width 70 greater than one of the first, second and third maximum widths 54, 56, 58. More specifically, the first sides 40 of the second and third expandable regions 50, 52 partially overlap the second side 42 of the first expandable region 48 along the first axis 44 when in the deployed position such that part of the first side 40 of the second and third expandable regions 50, 52 remain spaced from the second side 42 of the first expandable region 48 along the first axis 44 when in the deployed position. Said differently, the first expandable region 48 projects outwardly in front of the second and third expandable regions 50, 52 when in the deployed position. As shown in FIG. 9, the tether 68 contours around the first, second and third expandable regions 48, 50, 52 when in the deployed position. As such, in certain embodiments, the tether 68 is attached to the bladder 30 to move the second and third expandable regions 50, 52 toward each other when in the deployed position, which is at least partially due to the tether 68 contouring around the expanded first, second and third expandable regions 48, 50, 52. In other words, as the second and third expandable regions 50, 52 expand, these regions 50, 52 can expand more than the tether 68 and thus this expanded size can contribute to the movement of the second and third expandable regions 50, 52 toward each other. The tether 68 maintains the position of the expandable regions 48, 50, 52 relative to each other when in the deployed position.

Figure 20:
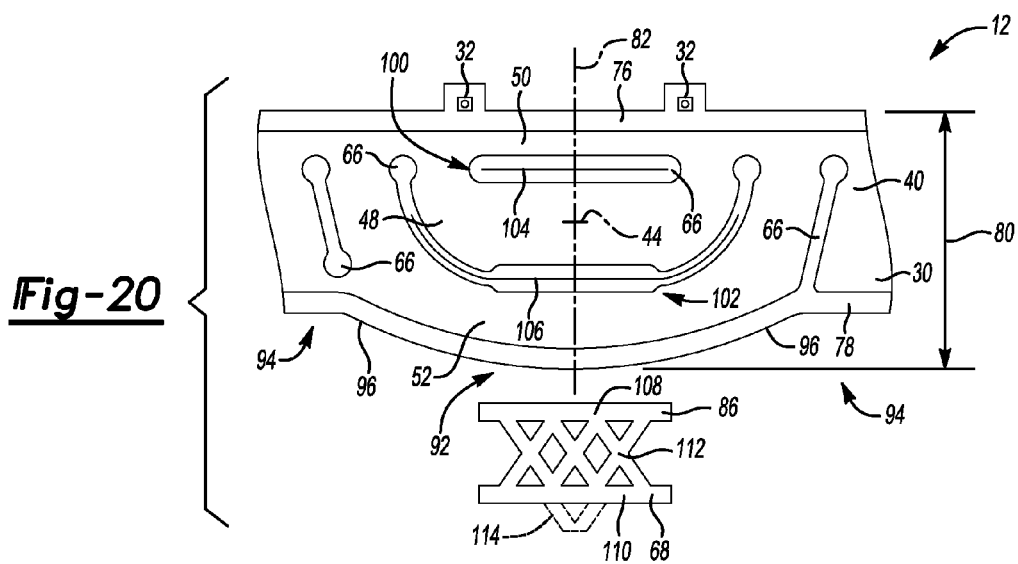
FIG. 20 is a schematic fragmentary side view of the airbag assembly of another embodiment in the pre-deployed position, with an optional tab illustrated in phantom lines.

As best shown in FIGS. 5 and 20, the bladder 30 can include a first peripheral end 76 and a second peripheral end 78 spaced from each other to define a length 80 of the bladder 30 transverse to the first axis 44 when in the pre-deployed position. More specifically, the length 80 of the bladder 30 is defined along a second axis 82 transverse to the first axis 44 when in the pre-deployed position. In certain embodiments, the first and second axes 44, 82 are perpendicular to each other. The length 80 can be further defined as a first length 80 when in the pre-deployed position and will be referred to as the first length 80 below. As shown in FIGS. 5 and 20, the first length 80 is determined when the bladder 30 is deflated and not folded or rolled in the installation orientation. The first length 80 is defined over the location of the tether 68 and at least partially over the first and second expandable regions 48, 50. It is to be appreciated that the phrase "along the second axis 82" can include substantially parallel to the second axis 82 or collinearly with the second axis 82.

As shown in FIGS. 4-6, 8 and 12, the bladder 30 can also include a peripheral edge 84 disposed between the first and second peripheral ends 76, 78. Generally, the peripheral edge 84 and the first and second peripheral ends 76, 78 cooperate to define an outer boundary of the bladder 30. In certain embodiments, the bladder 30 is attached or mounted to the vehicle structure 14 along the outer boundary. Generally, the outer boundary is not inflatable. For example, the bladder 30 can be attached or mounted to the vehicle structure 14 along one of the first and second peripheral ends 76, 78 (see FIGS. 5, 6, 8, 10, 12, 17-20 and 22). In other embodiments, the bladder 30 can be attached or mounted to the vehicle structure 14 along the peripheral edge 84 (see FIGS. 4-6, 8 and 12). In yet other embodiments, the bladder 30 can be attached or mounted to the vehicle structure 14 along the first peripheral end 76 and the peripheral edge 84. Therefore, one or more fasteners 32, as discussed above, can be attached to the outer boundary to attach the bladder 30 to the vehicle structure 14. Furthermore, one or more fasteners 32 can be attached to one or more ends of the tether 68, or extending from one or more ends of the tether 68, to attach the bladder 30 to the vehicle structure 14. It is to be appreciated that the first and second sides 40, 42 of the bladder 30 along the outer boundary can be attached or secured to each other by any suitable methods, such as for example, stitching, woven, adhesive, silicone, integrally woven together, etc.

Figure 29:
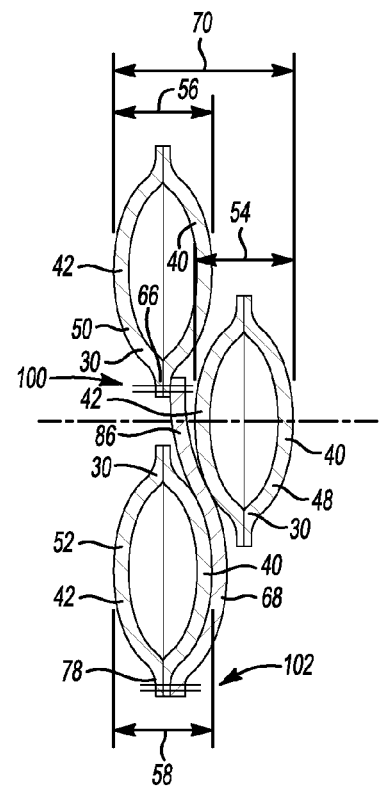
FIG. 29 is a schematic cross-sectional view of yet another embodiment of the airbag assembly with the tether attached to one separator region and the second peripheral end.

Turning back to the tether 68, as best shown in FIGS. 6, 8, 10, 12 and 17-20, for illustrative purposes only, the tether 68 can be in many different orientations and configurations. For example, the tether 68 can be a single component (see FIGS. 8, 10, 12, 18-20 and 22) or a plurality of components (see FIGS. 5, 6, 16, and 17). As another example, the tether 68 can be any suitable height, and for illustrative purposes only, the tether 68 is illustrated having a height to attach to the outer boundary as best shown in FIGS. 6, 8, 10, 17-19 and 24, and the tether 68 is illustrated having other heights to attach in other locations of the bladder 30 as best shown in FIGS. 20-23 and 25. Yet other examples have the tether 68 attached to the outer boundary and other locations of the bladder 30 as best shown in FIGS. 12 and 29. The height of the tether 68 corresponds to the desired movement of the second and/or third expandable regions 50, 52 relative to the first expandable region 48 when in the deployed position. For example, the tether 68 can be the same height as the distance between attachment regions 100, 102 or the tether 68 can be a different height from the distance between attachment regions 100, 102.

Figure 18:
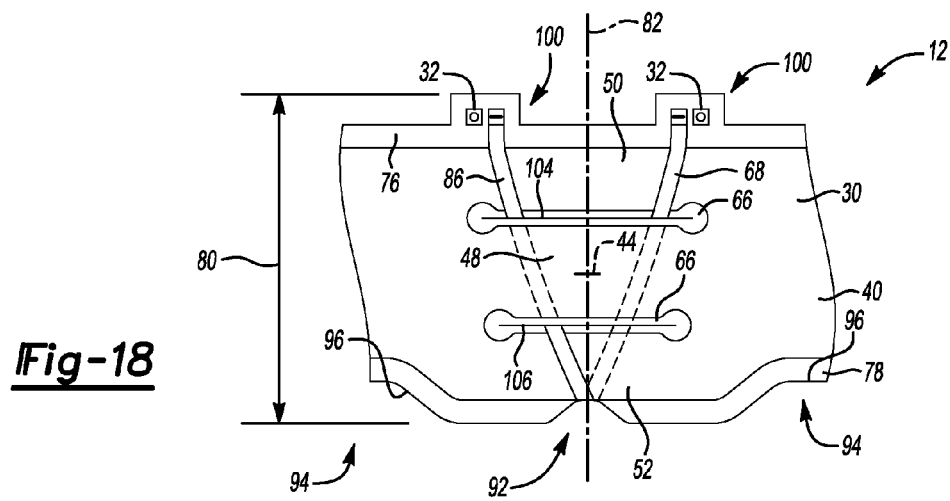
FIG. 18 is a schematic fragmentary side view of the airbag assembly with the tether in another configuration.
Figure 26:
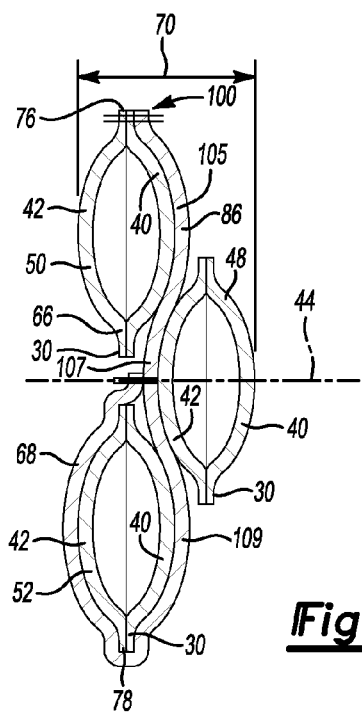
FIG. 26 is a schematic cross-sectional view of another embodiment of the airbag assembly with the tether wrapped around the second peripheral end and attached to itself.

Furthermore, in certain configurations of the tether 68 as illustrated in FIGS. 18 and 26, the tether 68 wraps around the second peripheral end 78 and over the second side 42 of the third expandable region 52. Specifically, in FIG. 18, the tether 68 wraps around the second peripheral end 78 such that the first and second ends 76, 78 of the tether 68 attach to the first peripheral end 76. The tether 68 at least partially surrounds the third expandable region 52 in FIG. 18. In another configuration of the tether 68, as illustrated in FIG. 26, the tether 68 wraps around the second peripheral end 78 and attaches to itself such that the tether 68 at least partially surrounds the third expandable region 52. In a similar configuration of the tether 68 of FIG. 26, the tether 68 can wrap around the second peripheral end 78 and attach to one of the separator regions 66 instead of attaching to itself. As another example, the tether 68 can attach to the first peripheral end 76 and wrap around the second peripheral end 78 and attach to one of the separator regions 66 between the first and third expandable regions 48, 52. As yet another example, the tether 68 can attach to one of the separator regions 66 between the first and second expandable regions 48, 50 and wrap around the second peripheral end 78 and attach to the same separator region 66 or attach to another one of the separator regions 66. As shown in FIG. 29, in another embodiment, the tether 68 can attach to one of the separator regions 66 and the second peripheral end 78. In another alternative, for the embodiments having the first and second expandable regions 48, 50 (i.e., the third expandable region 52 is eliminated), the tether 68 can wrap around the second peripheral end 78 and attach to itself, or attach to one of the separator regions 66 instead of attaching to itself, such that the tether 68 at least partially surrounds the first expandable region 48.

In various embodiments, the tether 68 can be further defined as a strap 86, with the strap 86 attached to the bladder 30 (as best shown in FIGS. 5, 8, 10, 12, 17-20, 22). The strap 86 can be different widths, and when comparing FIGS. 5 and 19, the strap 86 is narrower than the strap 86 in FIG. 19. As such, the wider strap 86 in FIG. 19 can be referred to as a panel. Furthermore, in various embodiments, the tether 68 can be further defined as a first strap 86 and a second strap 88 each attached to the bladder 30 (see FIGS. 5, 6, 16 and 17). Each of the first and second straps 86, 88 face the second side 42 of the first expandable region 48. For example, the tether 68 can be orientated in an "X" configuration (see FIGS. 6, 8 and 10), a "V" configuration (see FIG. 18), an inverted "V" configuration (see FIG. 17), a wide panel (see FIGS. 19 and 22), a plurality of different sized panels (see FIG. 12), an "XXX" configuration (see FIG. 20), etc. Generally, any of the configurations/orientations of the tether 68 discussed herein can be utilized with any of the configurations of the bladder 30 discussed herein. It is to be appreciated that the tether 68 can be other orientations and configurations not illustrated in the Figures. The tether 68 can be formed of any suitable materials and can optionally be woven or braided.

Furthermore, as shown in FIGS. 6 and 7, when the bladder 30 is inflated, the first and second expandable regions 48, 50 inflate which increases the width of the bladder 30 to the total width 70 which correspondingly changes the first length 80 to a deployed length 90. Specifically, the deployed length 90 is less than the first length 80 (compare FIGS. 5 and 6). As best shown in FIGS. 7, 9 and 11, the tether 68 contours around the first and second expandable regions 48, 50 when in the deployed position, thus correspondingly changing the height of the tether 68. Therefore, changes in the height of the tether 68 and changes in the length 80, 90 of the bladder 30 cooperate with each other.

Generally, as best shown in FIG. 5, the bladder 30 can include a first segment 92 defining the first length 80, with the tether 68 positioned along the first segment 92. Furthermore, the bladder 30 can include a second segment 94, with the second segment 94 defining a second length 91 between the first and second peripheral ends 76, 78. As best shown in FIG. 5, the second length 91 is less than the first length 80 to define a recess 96. Specifically, the recess 96 is disposed along the second segment 94. Optionally, the bladder 30 can include a strip 98 attached to the second peripheral end 78 along the second segment 94 to remove the recess 96. The strip 98 assists in assembling the airbag assembly 12. It is to be appreciated that the strip 98 can be defined as a plurality of strips 98. For example, the strip 98 assists with rolling or folding the bladder 30 to the installation position. The optional strips 98 are shown in phantom lines in FIG. 5 for illustrative purposes only and any of the configurations of the bladder 30 discussed herein can utilize one or more of the strips 98. The strips 98 can be separate pieces attached to the bladder 30 or the strips 98 can be integral or one piece with the bladder 30.

Figure 17:
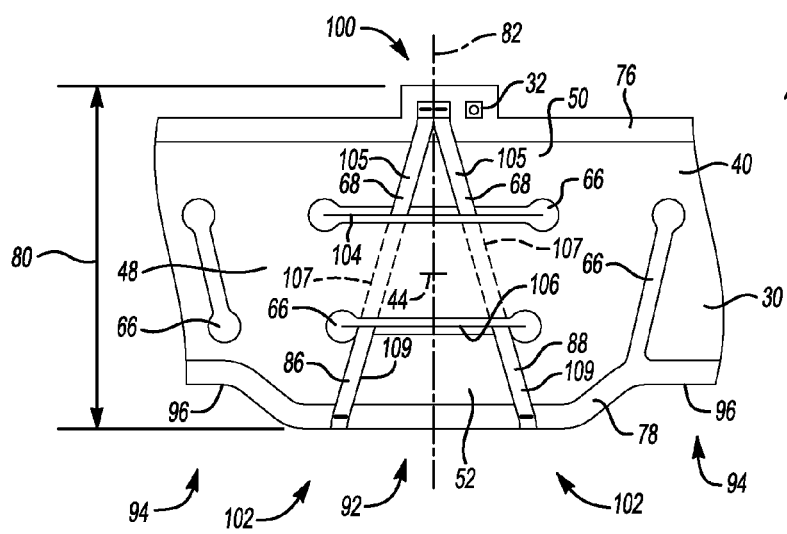
FIG. 17 is a schematic fragmentary side view of the airbag assembly with the tether in one configuration.
Figure 19:
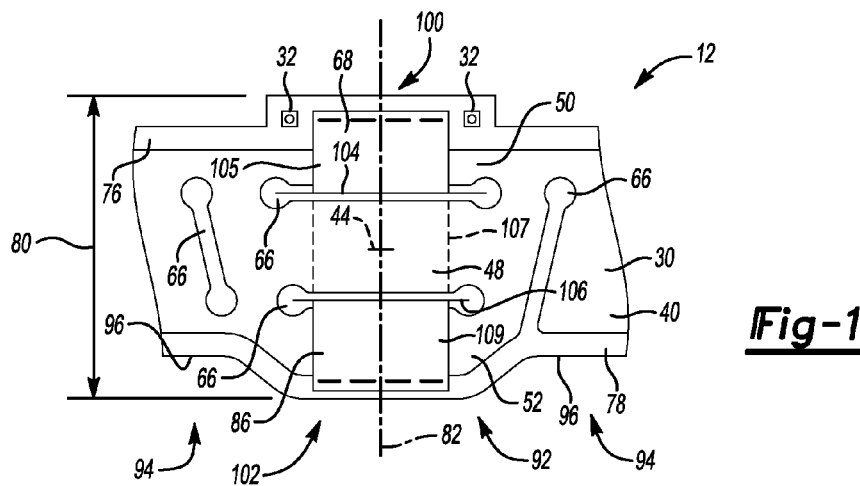
FIG. 19 is a schematic fragmentary side view of the airbag assembly with the tether in yet another configuration.

As shown in FIGS. 6, 8, 10 and 17-19, in certain embodiments, the bladder 30 can include a first attachment region 100 disposed along at least one of the first peripheral end 76 and the peripheral edge 84, and a second attachment region 102 disposed along the second peripheral end 78, with the tether 68 attached to the first and second attachment regions 100, 102. It is to be appreciated that at least one of the first peripheral end 76 and the peripheral edge 84 should be construed to include non-exclusive logical "or", i.e., at least one of the first peripheral end 76 or the peripheral edge 84 or combinations thereof. For example, as shown in FIGS. 10, 17 and 19, the first attachment region 100 can be along the first peripheral end 76 and the second attachment region 102 can be along the second peripheral end 78. As another example, as shown in FIGS. 20-23 and 25, the first attachment region 100 can be along one of the separator regions 66 and the second attachment region 102 can be along another one of the separator regions 66. As yet another example, the first attachment region 100 can be along the first peripheral end 76 and the peripheral edge 84 (see FIGS. 6 and 8). As yet another example, as shown in FIG. 12, the first attachment region 100 can be along one of the separator regions 66 and the second attachment region 102 can be along the peripheral edge 84. It is to be appreciated that bladder 30 can include any suitable number of attachment regions 100, 102. It is to further be appreciated that the first and second attachment regions 100, 102 can be in any suitable location and the various locations of the first and second attachment regions 100, 102 in the Figures are for illustrative purposes only. The tether 68 can be attached to the first and second attachment regions 100, 102 by any suitable methods, such as for example, stitching, adhesive, silicone, integrally woven together, etc. For illustrative purposes only, the Figures illustrate the tether 68 attached to the bladder 30 by stitches.

As best shown in FIGS. 5 and 6, in certain embodiments, the bladder 30 can define a slot 104 between the first and second expandable regions 48, 50. Generally, the tether 68 is disposed through the slot 104 such that a first portion 105 of the tether 68 abuts the first side 40 of the second expandable region 50 and a second portion 107 of the tether 68 abuts the second side 42 of the first expandable region 48. In other words, the tether 68 is fed through the slot 104 such that the tether 68 is disposed in front of the second expandable region 50 and behind the first expandable region 48 (see FIGS. 6 and 7). In certain embodiments, the slot 104 is defined by one of the separator regions 66.

Figure 25:
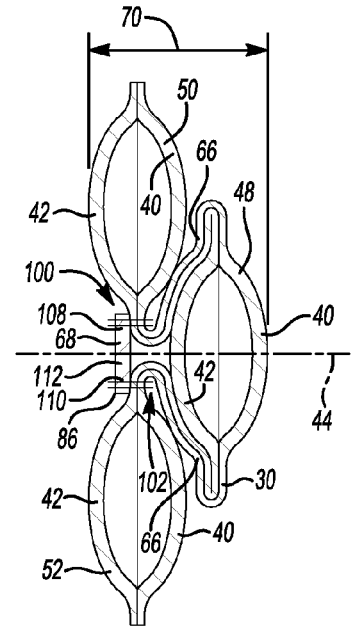
FIG. 25 is a schematic cross-sectional view of another embodiment of the airbag assembly with a plurality of slots eliminated and the tether attached to the second side of the bladder to create slack adjacent the first expandable region.

In certain embodiments, as shown in FIGS. 8, 10, 12 and 17-19, the slot 104 is further defined as a plurality of slots 104. For example, the bladder 30 can define a first slot 104 between the first and second expandable regions 48, 50 and a second slot 106 between the first and third expandable regions 48, 52. Generally, in these embodiments, the tether 68 can be disposed through the first and second slots 104, 106 such that the first portion 105 of the tether 68 overlaps the first side 40 of the second expandable region 50, the second portion 107 of the tether 68 overlaps the second side 42 of the first expandable region 48 and a third portion 109 of the tether 68 overlaps the first side 40 of the third expandable region 52. In certain embodiments, the tether 68 can be disposed through the first and second slots 104, 106 such that the first portion 105 of the tether 68 abuts the first side 40 of the second expandable region 50, the second portion 107 of the tether 68 abuts the second side 42 of the first expandable region 48 and the third portion 109 of the tether 68 abuts the first side 40 of the third expandable region 52. As shown in FIGS. 8, 10, 12 and 17-19, the first slot 104 can be defined by one of the separator regions 66 and the second slot 106 can be defined by another one of the separator regions 66. It is to be appreciated that more than two slots 104, 106 can be defined by the bladder 30 as shown in FIG. 12, and for the cross-sectional view of FIGS. 14-16 more than two slots 104, 106 are defined by the bladder 30 to feed the tether 68 between the various expandable regions 48, 50, 52, 53. Specifically, it is to be appreciated that any suitable number of slots 104, 106 can be utilized. It is to be appreciated that the tether 68 can also be attached to one of the separator regions 66 adjacent to one of the slots 104, 106 as illustrated by the phantom line rectangular boxes in FIG. 10, with the tether 68 being attachable to the separator regions 66 by any suitable methods, such as for example, stitching, adhesive, silicone, integrally woven together, etc. It is to be appreciated that the slots 104, 106 can be eliminated, as shown in FIG. 25, such that the tether 68 is attached to the second side 42 of the bladder 30 to create slack between the first and second expandable regions 48, 50 and create slack between the first and third expandable regions 48, 52 to allow the bladder 30 to expand to the deployed position.

Turning back to the first and second attachment regions 100, 102, in certain embodiments as shown in FIGS. 20-23, the first attachment region 100 is disposed between first and second expandable regions 48, 50 and the second attachment region 102 is disposed between the first and third expandable regions 48, 52. Furthermore, in these embodiments, the first attachment region 100 can define the first slot 104 and the second attachment region 102 can define the second slot 106. As such, the first attachment region 100 is disposed along one separator region 66 and the second attachment region 102 is disposed along another separator region 66. Therefore, in these embodiments, the tether 68 is attached to the first and second attachment regions 100, 102 along respective separator regions 66. The tether 68 is disposed through the first and second slots 104, 106 such that a first end portion 108 of the tether 68 extends through the first slot 104 to attach to the first attachment region 100, a second end portion 110 of the tether 68 extends through the second slot 106 to attach to the second attachment region 102, with a middle portion 112 of the tether 68 overlapping the second side 42 of the first expandable region 48. Therefore, in the embodiments of FIGS. 20-23, the tether 68 does not overlap the second and third expandable regions 50, 52. It is to be appreciated in FIG. 22, the middle portion 112 of the tether 68 overlaps the second side 42 of the first expandable region 48 and one of the additional expandable regions 53. Any of the configurations of the tether 68 discussed above can be utilized with this embodiment. Furthermore, the zigzag configuration of one of the separator regions 66 in FIG. 22 can be eliminated.

Figure 21:
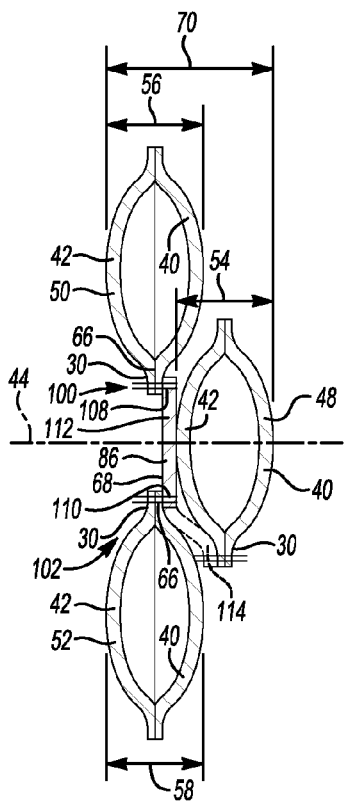
FIG. 21 is a schematic cross-sectional view of the airbag assembly of FIG. 20 in the deployed position, with the optional tab illustrated in phantom lines.
Figure 23:
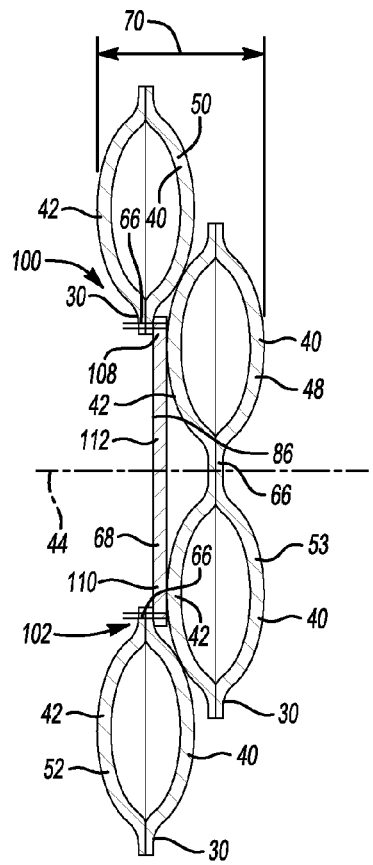
FIG. 23 is a schematic cross-sectional view of the airbag assembly taken from lines 23-23 of FIG. 22.
Figure 22:
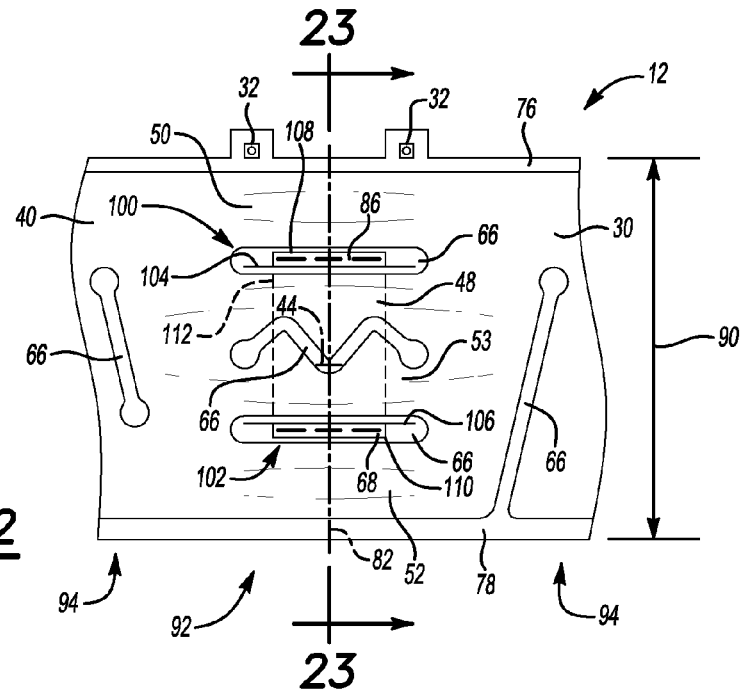
FIG. 22 is a schematic fragmentary side view of the airbag assembly of another embodiment.

As shown in FIG. 20, the tether 68 can optionally include a tab 114 (as shown in phantom lines) to pre-position the desired expandable regions 48, 50, 52, 53 to further obtain the desired amount of overlap when in the deployed position and/or to lift one of the expandable regions 48, 50, 52, 53 when in the deployed position. The tab 114 can be attached to the first expandable region 48 as shown in FIG. 21 to lift the first expandable region 48. It is to be appreciated that any of the embodiments discussed herein can include one or more tabs 114.

Figure 27:
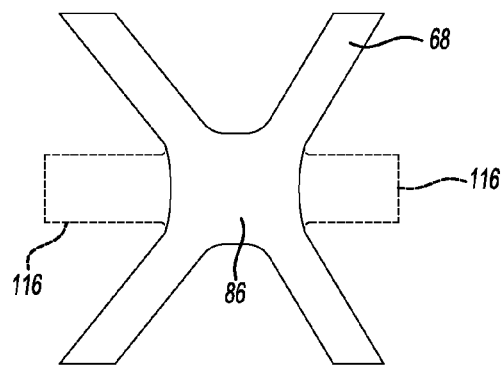
FIG. 27 is a schematic side view of one embodiment of the tether, with an optional flap illustrated in phantom lines.

Optionally, as shown in FIGS. 8 and 27 in phantom lines, the tether 68 can include a flap 116 extending through the first and second slots 104, 106 and attached to one of the first and second sides 40, 42 of the bladder 30 to at least partially cover an opening between the second and third expandable regions 50, 52 when in the deployed position. For example, the flap 116 can at least partially cover one or more of the slots 104, 106 between the expandable regions 48, 50, 52, 53. More specifically, the flap 116 can be attached to a pair of separator regions 66 to anchor the ends of the flap 116 thereto. In one embodiment, the flap 116 is attached to the first side 40 of the bladder 30 along the separator regions 66. The flap 116 can be attached to the bladder 30 by any suitable methods, such as for example, stitching, adhesive, silicone, integrally woven together, etc. Furthermore, the flap 116 can be integral or formed of one piece with the tether 68 to define a unit. Alternatively, the flap 116 can be attached or secured to the tether

68 by any suitable methods, such as for example, stitching, adhesive, silicone, integrally woven together, etc. It is to be appreciated any suitable number of flaps 116 can be utilized with any of the embodiments defining one or more slots 104, 106.

Figure 28:
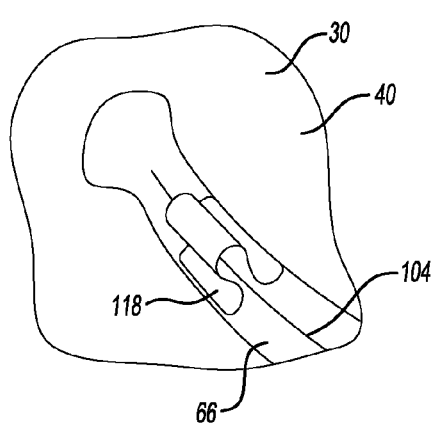
FIG. 28 is a schematic fragmentary perspective view of a separator region defining a slot, with a bridge attached to the separator region.

As shown in FIG. 28, optionally, the airbag assembly 12 can include a bridge 118 attached to the bladder 30 adjacent to the slot 104 to at least partially cover the slot 104 that opens when in the deployed position. For example, the bridge 118 can be attached to one of the first and second attachment regions 100, 102 or one of the first and second separator regions 66 to cover the slot 104. It is to be appreciated any suitable number of bridges 118 can be utilized with any of the embodiments defining one or more slots 104, 106. The bridge 118 is attachable to the first and second attachment regions 100, 102 and/or the separator regions 66 by any suitable methods, such as for example, stitching, adhesive, silicone, integrally woven together, etc.

The bladder 30 can be formed of any suitable material and for example can be formed of fabric. As such, the fabric can be woven or weaved in different directions. The fabric material can expand/stretch in a direction 45 degrees from the warp and weft of the woven material but will expand/stretch very little along the axes of the warp and weft. Thus by determining the warp and weft orientation for each bladder 30, the expansion of the bladder 30 can be controlled. For instance, if the weave of the tether 68 is oriented so that the warp or the weft is along the axis of the tether 68, which minimizes its expansion/stretch when the bladder 30 is inflated to the deployed position, and the first and second sides 40, 42 of the bladder 30 have the warp and weft 45 degrees with respect to the tether 68, the corresponding expandable regions 48, 50, 52 formed by the first and second sides 40, 42 can expand or stretch significantly with respect to the tether 68 allowing the tether 68 to direct the expandable regions 48, 50, 52 more easily into an overlapped position relative to each other.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An airbag assembly for a vehicle, the assembly comprising:
   a bladder adapted to be attached to the vehicle and including a first side and a second side opposing each other along a first axis, with the bladder presenting a pre-deployed position being deflated and a deployed position being inflated;
   wherein the bladder includes a first expandable region and a second expandable region adjacent to each other, with the first and second expandable regions each having the first and second sides;
   wherein the first expandable region defines a first maximum width between the first and second sides of the first expandable region along the first axis when in the deployed position and the second expandable region defines a second maximum width between the first and second sides of the second expandable region along the first axis when in the deployed position; and
   a tether facing the second side of the first expandable region and attached to the bladder such that the first side of the second expandable region and the second side of the first expandable region partially overlap each other in the deployed position to cause the first expandable region to deploy outwardly in front of the second expandable region to define a total width along the first axis greater than one of the first and second maximum widths;
   wherein the first side of the second expandable region and the second side of the first expandable region partially overlap each other along the first axis when in the deployed position such that part of the second side of the first expandable region and part of the first side of the second expandable region remain spaced from each other along the first axis when in the deployed position;
   wherein the bladder includes a first peripheral end and a second peripheral end spaced from each other to define a length of the bladder transverse to the first axis when in the pre-deployed position, and wherein the bladder includes a peripheral edge disposed between the first and second peripheral ends, with a first attachment region disposed along at least one of the first peripheral end and the peripheral edge, and a second attachment region disposed along the second peripheral end, with the tether attached to the first and second attachment regions.

2. An assembly as set forth in claim 1 wherein the bladder defines a slot between the first and second expandable regions, with the tether disposed through the slot such that a first portion of the tether abuts the first side of the second expandable region and a second portion of the tether abuts the second side of the first expandable region.

3. An assembly as set forth in claim 2 further including a bridge attached to the bladder adjacent to the slot to at least partially cover the slot that opens when in the deployed position.

4. An assembly as set forth in claim 1 wherein the length is further defined as a first length, and wherein the bladder includes a first segment defining the first length, and wherein the bladder includes a second segment defining a second length between the first and second peripheral ends when in the pre-deployed position, with the second length being less than the first length to define a recess, and wherein the bladder includes a strip attached to the second peripheral end along the second segment to remove the recess.

5. An assembly as set forth in claim 1 wherein the tether is further defined as a strap.

6. An airbag assembly for a vehicle, the assembly comprising:
   a bladder adapted to be attached to the vehicle and including a first side and a second side opposing each other along a first axis, with the bladder presenting a pre-deployed position being deflated and a deployed position being inflated;
   wherein the bladder includes a first expandable region and a second expandable region adjacent to each other, with the first and second expandable regions each having the first and second sides;
   wherein the first expandable region defines a first maximum width between the first and second sides of the first expandable region along the first axis when in the deployed position and the second expandable region defines a second maximum width between the first and second sides of the second expandable region along the first axis when in the deployed position; and a tether facing the second side of the first expandable region and attached to the bladder such that the first side of the second expandable region and the second side of the first expandable region partially overlap each other in the deployed position to cause the first expandable region to deploy outwardly in front of the second expandable region to define a total width along the first axis greater than one of the first and second maximum widths;

wherein the first side of the second expandable region and the second side of the first expandable region partially overlap each other along the first axis when in the deployed position such that part of the second side of the first expandable region and part of the first side of the second expandable region remain spaced from each other along the first axis when in the deployed position;

wherein the bladder includes a third expandable region, with the third expandable region having the first and second sides, and with the third expandable region defining a third maximum width between the first and second sides of the third expandable region along the first axis when in the deployed position, and wherein the tether is attached to the bladder such that the first sides of the second and third expandable regions and the second side of the first expandable region partially overlap each other in the deployed position to cause the first expandable region to deploy outwardly in front of the second and third expandable regions along the first axis to further define the total width greater than one of the first, second and third maximum widths.

7. An assembly as set forth in claim 6 wherein the bladder includes a first peripheral end and a second peripheral end spaced from each other to define a length of the bladder transverse to the first axis when in the pre-deployed position, and wherein the bladder includes a peripheral edge disposed between the first and second peripheral ends, with a first attachment region disposed along at least one of the first peripheral end and the peripheral edge, and a second attachment region disposed along the second peripheral end, with the tether attached to the first and second attachment regions.

8. An assembly as set forth in claim 6 wherein the bladder defines a first slot between the first and second expandable regions and a second slot between the first and third expandable regions, with the tether disposed through the first and second slots such that a first portion of the tether abuts the first side of the second expandable region, a second portion of the tether abuts the second side of the first expandable region and a third portion of the tether abuts the first side of the third expandable region.

9. An assembly as set forth in claim 8 wherein the tether includes a flap extending through the first and second slots and attached to one of the first and second sides of the bladder to at least partially cover an opening between the second and third expandable regions when in the deployed position.

10. An assembly as set forth in claim 6 wherein the bladder includes a first attachment region disposed between the first and second expandable regions and a second attachment region disposed between the first and third expandable regions, with the first attachment region defining a first slot and the second attachment region defining a second slot, with the tether disposed through the first and second slots such that a first end portion of the tether extends through the first slot to attach to the first attachment region, a second end portion of the tether extends through the second slot to attach to the second attachment region, with a middle portion of the tether overlapping the second side of the first expandable region.

11. An assembly as set forth in claim 6 wherein the bladder includes a first peripheral end and a second peripheral end spaced from each other to define a length of the bladder transverse to the first axis when in the pre-deployed position, and wherein the bladder defines a first slot between the first and second expandable regions and a second slot between the first and third expandable regions, with the tether disposed through the first and second slots such that a first portion of the tether abuts the first side of the second expandable region, a second portion of the tether abuts the second side of the first expandable region, a third portion of the tether abuts the first side of the third expandable region and the tether wraps around the second peripheral end and over the second side of the third expandable region.

12. An assembly as set forth in claim 6 wherein the tether is further defined as a strap.

13. A vehicle comprising:

a vehicle structure defining an interior compartment;

an airbag assembly including:

a bladder attached to the vehicle structure and including a first side and a second side opposing each other along a first axis, with the bladder presenting a pre-deployed position being deflated and a deployed position being inflated, and with the first side facing inwardly toward the interior compartment when in the deployed position and the second side facing outwardly away from the interior compartment when in the deployed position;

wherein the bladder includes a first expandable region and a second expandable region adjacent to each other, with the first and second expandable regions each having the first and second sides;

wherein the first expandable region defines a first maximum width between the first and second sides of the first expandable region along the first axis when in the deployed position and the second expandable region defines a second maximum width between the first and second sides of the second expandable region along the first axis when in the deployed position; and a tether facing the second side of the first expandable region and attached to the bladder such that the first side of the second expandable region and the second side of the first expandable region partially overlap each other in the deployed position to cause the first expandable region to deploy outwardly in front of the second expandable region to define a total width along the first axis greater than one of the first and second maximum widths;

wherein the first expandable region projects outwardly into the interior compartment away from the vehicle structure when in the deployed position, and wherein the first side of the second expandable region and the second side of the first expandable region partially overlap each other along the first axis when in the deployed position such that part of the second side of the first expandable region and part of the first side of the second expandable region remain spaced from each other along the first axis when in the deployed position;

wherein the bladder defines a slot between the first and second expandable regions, with the tether disposed through the slot such that a first portion of the tether abuts the first side of the second expandable region and a second portion of the tether abuts the second side of the first expandable region.

14. A vehicle as set forth in claim 13 wherein the bladder includes a first peripheral end and a second peripheral end spaced from each other to define a length of the bladder transverse to the first axis when in the pre-deployed position, and wherein the bladder includes a peripheral edge disposed between the first and second peripheral ends, with a first attachment region disposed along at least one of the first peripheral end and the peripheral edge, and a second attachment region disposed along the second peripheral end, with the tether attached to the first and second attachment regions.

15. An assembly as set forth in claim 14 wherein the length is further defined as a first length, and wherein the bladder includes a first segment defining the first length, and wherein the bladder includes a second segment defining a second length between the first and second peripheral ends when in the pre-deployed position, with the second length being less than the first length to define a recess, and wherein the bladder includes a strip attached to the second peripheral end along the second segment to remove the recess.

16. A vehicle as set forth in claim 13 wherein the bladder includes a third expandable region, with the third expandable region having the first and second sides, and with the third expandable region defining a third maximum width between the first and second sides of the third expandable region along the first axis when in the deployed position, and wherein the tether is attached to the bladder such that the first sides of the second and third expandable regions and the second side of the first expandable region partially overlap each other in the deployed position to cause the first expandable region to deploy outwardly in front of the second and third expandable regions along the first axis to further define the total width greater than one of the first, second and third maximum widths.

17. A vehicle as set forth in claim 16 wherein the bladder includes a first peripheral end and a second peripheral end spaced from each other to define a length of the bladder transverse to the first axis when in the pre-deployed position, and wherein the bladder includes a peripheral edge disposed between the first and second peripheral ends, with a first attachment region disposed along at least one of the first peripheral end and the peripheral edge, and a second attachment region disposed along the second peripheral end, with the tether attached to the first and second attachment regions.

18. A vehicle as set forth in claim 16 wherein the slot is further defined as a first slot and the bladder defines the first slot between the first and second expandable regions and a second slot between the first and third expandable regions, with the tether disposed through the first and second slots such that a first portion of the tether abuts the first side of the second expandable region, a second portion of the tether abuts the second side of the first expandable region and a third portion of the tether abuts the first side of the third expandable region.

19. An assembly as set forth in claim 18 wherein the tether includes a flap extending through the first and second slots and attached to one of the first and second sides of the bladder to at least partially cover an opening between the second and third expandable regions when in the deployed position.

20. An assembly as set forth in claim 13 further including a bridge attached to the bladder adjacent to the slot to at least partially cover the slot that opens when in the deployed position.

* * * * *